(12) United States Patent
Innes

(10) Patent No.: US 11,571,723 B1
(45) Date of Patent: Feb. 7, 2023

(54) MECHANICAL DRY WASTE EXCAVATING END EFFECTOR

(71) Applicant: AGI Engineering, Inc., Stockton, CA (US)

(72) Inventor: Alex G. Innes, Lodi, CA (US)

(73) Assignee: AGI Engineering, Inc., Stockton, CA (US)

( * ) Notice: Subject to any disclaimer, the term of this patent is extended or adjusted under 35 U.S.C. 154(b) by 453 days.

(21) Appl. No.: 16/832,379

(22) Filed: Mar. 27, 2020

Related U.S. Application Data

(60) Provisional application No. 62/826,365, filed on Mar. 29, 2019.

(51) Int. Cl.
| | |
|---|---|
| *B25J 15/00* | (2006.01) |
| *B08B 9/087* | (2006.01) |
| *B25J 11/00* | (2006.01) |
| *B02C 4/02* | (2006.01) |
| *G21F 9/34* | (2006.01) |
| *B02C 18/00* | (2006.01) |

(52) U.S. Cl.
CPC ............ *B08B 9/087* (2013.01); *B02C 4/02* (2013.01); *B02C 18/0092* (2013.01); *B25J 11/0085* (2013.01); *B25J 15/0019* (2013.01); *G21F 9/34* (2013.01)

(58) Field of Classification Search
CPC ....... B05C 5/0208; B05B 5/165; B05B 12/20; B05B 12/082; B05B 5/0255; B05B 5/10; B05D 1/045; B05D 1/04; B05D 2601/20; C08L 27/12; C08L 25/18; C01B 32/159; H01L 51/0048; H01L 51/052; H01L 29/78696; Y02P 70/50; B82Y 30/00; Y02E 10/549
See application file for complete search history.

(56) References Cited

U.S. PATENT DOCUMENTS

| | | |
|---|---|---|
| 1,611,326 A | 12/1926 | Abbe |
| 2,461,433 A | 2/1949 | Moulton |
| 2,611,523 A | 9/1952 | Aines |
| 2,668,625 A | 2/1954 | Garland |
| 2,669,941 A | 2/1954 | Stafford |
| 2,682,886 A | 7/1954 | Paxton |
| 2,761,297 A | 9/1956 | Buchsteiner |

(Continued)

FOREIGN PATENT DOCUMENTS

| | | |
|---|---|---|
| EP | 1166903 A2 | 1/2002 |
| EP | 3151246 A1 | 4/2017 |

(Continued)

OTHER PUBLICATIONS

Yao et al., Research on the tele-operation robot system with tele-presence, 2011, IEEE, p. 2308-2311 (Year: 2011).*

(Continued)

*Primary Examiner* — McDieunel Marc
(74) *Attorney, Agent, or Firm* — Brian S. Steinberger; Hilary F. Steinberger; Law Offices of Brian S. Steinberger, P.A.

(57) ABSTRACT

Systems, devices, apparatus and methods for cleaning contaminated tanks without introducing large amounts of free water or liquefier into the tanks. A gathering arm assembly and a bucket assembly is used to remove and break up waste debris from a contaminated tank.

18 Claims, 15 Drawing Sheets

(56) References Cited

U.S. PATENT DOCUMENTS

| | | | |
|---|---|---|---|
| 2,819,803 A | 1/1958 | Obenchain | |
| 2,833,422 A | 5/1958 | Ferwerda | |
| 2,985,192 A | 5/1961 | Taylor | |
| 2,999,600 A | 9/1961 | Gates | |
| 3,060,972 A | 10/1962 | Sheldon | |
| 3,095,044 A | 6/1963 | Medlock | |
| 3,116,021 A | 12/1963 | Bom | |
| 3,155,048 A | 11/1964 | Mandelbaum | |
| 3,161,490 A | 12/1964 | Dudek | |
| 3,162,214 A | 12/1964 | Bazinet, Jr. | |
| 3,190,286 A | 6/1965 | Stokes | |
| 3,266,059 A | 8/1966 | Stelle | |
| 3,274,850 A | 9/1966 | Tascio | |
| 3,305,220 A | 2/1967 | Nevulis | |
| 3,469,712 A | 9/1969 | Haulotte | |
| 3,497,083 A | 2/1970 | Anderson | |
| 3,580,099 A | 5/1971 | Mosher | |
| 3,599,871 A | 8/1971 | Ruppel | |
| 3,757,697 A | 9/1973 | Phinney | |
| 3,788,338 A | 1/1974 | Burns | |
| 3,845,596 A | 11/1974 | Veenstra | |
| 3,863,844 A | 2/1975 | McMillan | |
| 3,889,818 A | 6/1975 | Wennerstrom | |
| 3,932,065 A | 1/1976 | Ginsberg et al. | |
| 3,951,572 A | 4/1976 | Ray, Jr. et al. | |
| 4,106,671 A | 8/1978 | Sharples | |
| 4,132,041 A | 1/1979 | Van den Broek | |
| 4,156,331 A | 5/1979 | Lester et al. | |
| 4,250,933 A | 2/1981 | Olson | |
| 4,339,232 A | 7/1982 | Campbell | |
| 4,396,093 A | 8/1983 | Zimmerman | |
| 4,396,728 A | 8/1983 | Faler | |
| 4,415,297 A | 11/1983 | Boring | |
| 4,494,417 A | 1/1985 | Larson et al. | |
| 4,540,669 A | 9/1985 | Bertland et al. | |
| 4,630,741 A | 12/1986 | Stevens | |
| 4,661,039 A | 4/1987 | Brenholt | |
| 4,685,349 A | 8/1987 | Wada et al. | |
| 4,817,653 A | 4/1989 | Krajicek et al. | |
| 4,828,461 A | 5/1989 | Laempe | |
| 4,848,179 A | 7/1989 | Ubhayakar | |
| 4,944,535 A | 7/1990 | Maupin | |
| 4,945,955 A | 8/1990 | Murphy | |
| 4,977,790 A | 12/1990 | Nishi et al. | |
| 5,007,803 A | 4/1991 | DiVito et al. | |
| D326,336 S | 5/1992 | Christ | |
| 5,172,710 A | 12/1992 | Harrington | |
| 5,174,168 A | 12/1992 | Takagi et al. | |
| 5,297,443 A | 3/1994 | Wentz | |
| 5,439,020 A | 8/1995 | Lockhart | |
| 5,451,135 A | 9/1995 | Schempf et al. | |
| 5,515,654 A | 5/1996 | Anderson | |
| 5,518,553 A | 5/1996 | Moulder | |
| 5,540,172 A | 7/1996 | Goldbach et al. | |
| 5,607,000 A | 3/1997 | Cripe et al. | |
| 5,715,852 A | 2/1998 | Jepsen | |
| 5,740,821 A | 4/1998 | Arnold | |
| 5,913,320 A | 6/1999 | Varrin, Jr. et al. | |
| 6,213,135 B1 | 4/2001 | Moulder | |
| 6,264,434 B1 | 7/2001 | Frank | |
| 6,273,790 B1 | 8/2001 | Neese et al. | |
| 6,280,408 B1 | 8/2001 | Sipin | |
| 6,561,368 B1 | 5/2003 | Sturm, Jr. et al. | |
| 6,651,837 B2 | 11/2003 | Stradinger et al. | |
| 6,830,079 B1 | 12/2004 | Ahrens et al. | |
| 6,836,982 B1* | 1/2005 | Augustine | E02F 9/205 |
| | | | 701/50 |
| 6,889,920 B2 | 5/2005 | Nance et al. | |
| 6,938,691 B2 | 9/2005 | Face | |
| 7,021,675 B2 | 4/2006 | Lawson | |
| 7,032,628 B2 | 4/2006 | Guillemette et al. | |
| 7,100,631 B2 | 9/2006 | Liu et al. | |
| 7,241,080 B2 | 7/2007 | Klobucar et al. | |
| 7,708,504 B2 | 5/2010 | Heckendorn et al. | |
| 7,998,251 B2 | 8/2011 | Pondelick | |
| 8,069,747 B2 | 12/2011 | Buckingham | |
| 8,205,522 B2 | 6/2012 | Buckingham | |
| 8,347,563 B2 | 1/2013 | Anderson | |
| 8,414,246 B2 | 4/2013 | Tobey | |
| 8,702,399 B2 | 4/2014 | Krohn | |
| 8,727,671 B2 | 5/2014 | Sundholm | |
| 8,763,855 B1 | 7/2014 | Harvey | |
| 8,840,087 B2 | 9/2014 | Guyard | |
| 9,195,238 B2 | 11/2015 | Roden et al. | |
| 9,670,641 B2* | 6/2017 | Paull | E02F 3/3417 |
| 9,903,100 B2* | 2/2018 | Fletcher | E02F 9/265 |
| 10,280,063 B2 | 5/2019 | Innes et al. | |
| 10,406,571 B2 | 9/2019 | Innes et al. | |
| 2002/0002426 A1 | 1/2002 | Burkhard | |
| 2003/0115779 A1* | 6/2003 | Satzler | E02F 3/439 |
| | | | 37/348 |
| 2003/0132729 A1* | 7/2003 | Yoshimatsu | E02F 9/2228 |
| | | | 320/104 |
| 2005/0025573 A1 | 2/2005 | Waldman et al. | |
| 2005/0109376 A1 | 5/2005 | Gregory | |
| 2005/0166413 A1 | 8/2005 | Crampton | |
| 2006/0054189 A1 | 3/2006 | Luke et al. | |
| 2006/0054202 A1 | 3/2006 | Luke et al. | |
| 2008/0148876 A1 | 6/2008 | Hock et al. | |
| 2009/0031891 A1* | 2/2009 | Brinkman | E02F 9/2228 |
| | | | 60/327 |
| 2010/0221125 A1 | 9/2010 | Fulkerson et al. | |
| 2010/0234988 A1 | 9/2010 | Buckingham et al. | |
| 2010/0264013 A1 | 10/2010 | Burton | |
| 2011/0186657 A1 | 8/2011 | Haviland | |
| 2011/0315165 A1 | 12/2011 | McWhorter | |
| 2012/0106882 A1 | 5/2012 | Ponnouradjou et al. | |
| 2012/0246848 A1 | 10/2012 | Hruby | |
| 2012/0279537 A1 | 11/2012 | Peeters et al. | |
| 2013/0000672 A1 | 1/2013 | Bovio et al. | |
| 2014/0079573 A1 | 3/2014 | Pabst | |
| 2015/0034176 A1 | 2/2015 | Arguelles et al. | |
| 2015/0036200 A1 | 2/2015 | Matsushita et al. | |
| 2015/0124242 A1 | 5/2015 | Pierce | |
| 2016/0055268 A1 | 2/2016 | Bell et al. | |
| 2016/0107207 A1 | 4/2016 | DesOrmeaux | |
| 2017/0173617 A1 | 6/2017 | Zilai et al. | |
| 2017/0259309 A1 | 9/2017 | Innes et al. | |
| 2019/0134820 A1 | 5/2019 | Holliday, Jr. et al. | |

FOREIGN PATENT DOCUMENTS

| | | |
|---|---|---|
| IN | 201741036558 | 10/2017 |
| JP | 2004301665 A | 10/2004 |
| WO | 2009018599 A1 | 2/2009 |
| WO | 2014019852 A1 | 2/2014 |
| WO | 2019094766 A1 | 5/2019 |

OTHER PUBLICATIONS

Chacko et al., State of the art in excavators, 2014, IEEE, p. 481-488 (Year: 2014).*

Elton., Comparison of human-machine interfaces designed for novices teleoperating multi-DOF hydraulic manipulators,2011, IEEE, p. 395-400 (Year: 2011).*

Yang et al., Hydraulic simulation and remote control system of field robot, 2008, IEEE, p. 2303-2308 (Year: 2008).*

OCEANEERING International, Inc., PCT Patent Application No. PCT/US18/060093, filed Nov. 9, 2018, Notification of Transmittal of the International Search Report and the Written Opinion of the International Searching Authority, or the Declaration dated Feb. 5, 2019, 3 pages.

Innes, Alex. G., PCT Patent Application No. PCT/US19/036567, filed Jun. 11, 2019, Notification of Transmittal of the International Search Report and the Written Opinion of the International Search Authority, or the Declaration dated Sep. 17, 2019, 8 pages.

Innes, et al., PCT Patent Application No. PCT/US27/018120, filed Feb. 16, 2017, Notification Concerning Transmittal of International Preliminary Report on Patentability, 12 pages.

Innes, et al., PCT Patent Application No. PCT/US17/018120 filed Feb. 16, 2017, Notification of the Transmittal of the International

(56) References Cited

OTHER PUBLICATIONS

Search Report and the Written Opinion of the International Searching Authority, or the Declaration dated May 10, 2017, 14 pages.
Lane, et al. "FY10 Engineering Innovations, Research and Technology Report" In: Lawrence Livermore National Lab. Jan. 31, 2011 (Jan. 31, 2011) retrieved on Aug. 10, 2019 (Aug. 10, 2019) from https://e-reports-ext.llnl.gov/pdf/461932.pdf, 99 pages.
Bullseye Pumps, Bullseye B200-SPDK Vacuum Loading Solids Pump, 2017, retrieved from http://www.bullseyepumps.com/products/bullseye-b200-spdk-vacuum-loading-solids-pump?variant=31478670788, 10 pages.
Sykes Pumps, General Purpose, GP50 Pump Performance, 2017, retrieved from http://www.sykespumps.com.sa/pumps/product-specs/gp_50_75.html, 2 pages.
Pentair Southern Cross, SX60 Portable Slurry Pump, 2017, retrieved from http://southerncross.pentair.com.au/product/market/pumps/vacuum-pumps/sx60-portable-slurry-pump/, 3 pages.
Wastecorp, Pumps, Super Duty, VP-65 Series Vacuum Pumps, 2017, brochure, 1 page.
RITCHIEspecs, Gradall 534D-9-45 Telescopic Forklift, 2017, retrieved from www.ritchiespecs.com, 2 pages.
Boom, Gradall Material Handler 534 D-6534 D-6 Turbo, Jul. 2002, 1 page.
Manitowoc, National Crane 600H Series Product Guide, 2012, 16 pages.
Manitowoc, National Crane 680H-TM, Aug. 2015, 4 pages.
Festo, Bionic Handling Assistant, Apr. 2012, 6 pages.
Schutz, Maxon Motor, Robotic Snake-Arm Flies Right into Tight Spaces, 2012, 4 pages.
McMahan, W., et al., Field Trials and Testing of the OctArm Continuum Manipulator, IEEE, May 2006, pp. 2336-2341, 6 pages.
Li, Z., et al., A Novel Tele-Operated Flexible Robot Target for Minimally Invasive Robotic Surgery, Engineering Research Robotics Article, Mar. 2015, pp. 073-078, vol. 1, Issue 1, 6 pages.
Li, Z., et al., Kinematic Comparison of Surgical Tendon-Driven Manipulators and Concentric Tube Manipulators, Mechanism and Machine Theory, 2017, pp. 148-165, vol. 7, 18 pages.
OCRobotics, Laser Snake 2, Snake-arm robot and high-power laser integration, www.ocrobotics.com, 2016, 4 pages.
OCRobotics, Nuclear decommissioning case-study, Laser Snake, Snake-arm robot and high-power laser integration, www.ocrobotics.com, 2016, 4 pages.
Bauer, et al., Development and Deployment of the Extended Reach Sluicing System (ERSS) for Retrieval of Hanford Single Shell Tank Waste—14206 (Draft), U.S. Department of Energy, Assistant Secretary for Environmental Management, Washington River Protection Solutions, Nov. 2013, 19 pages.
Pearson, M.J. et. al., Biomimetic Vibrissal Sensing for Robots, Philosophical Transactions of the Royal Society B, 2011, 366, 3085-3096, 12 pages.
Innes, Alex. G., PCT Patent Application No. PCT/US19/0068359, filed Dec. 23, 2019, Notification of Transmittal of the International Search Report and the Written Opinion of the International Search Authority, or the Declaration dated Feb. 25, 2020, 13 pages.

\* cited by examiner

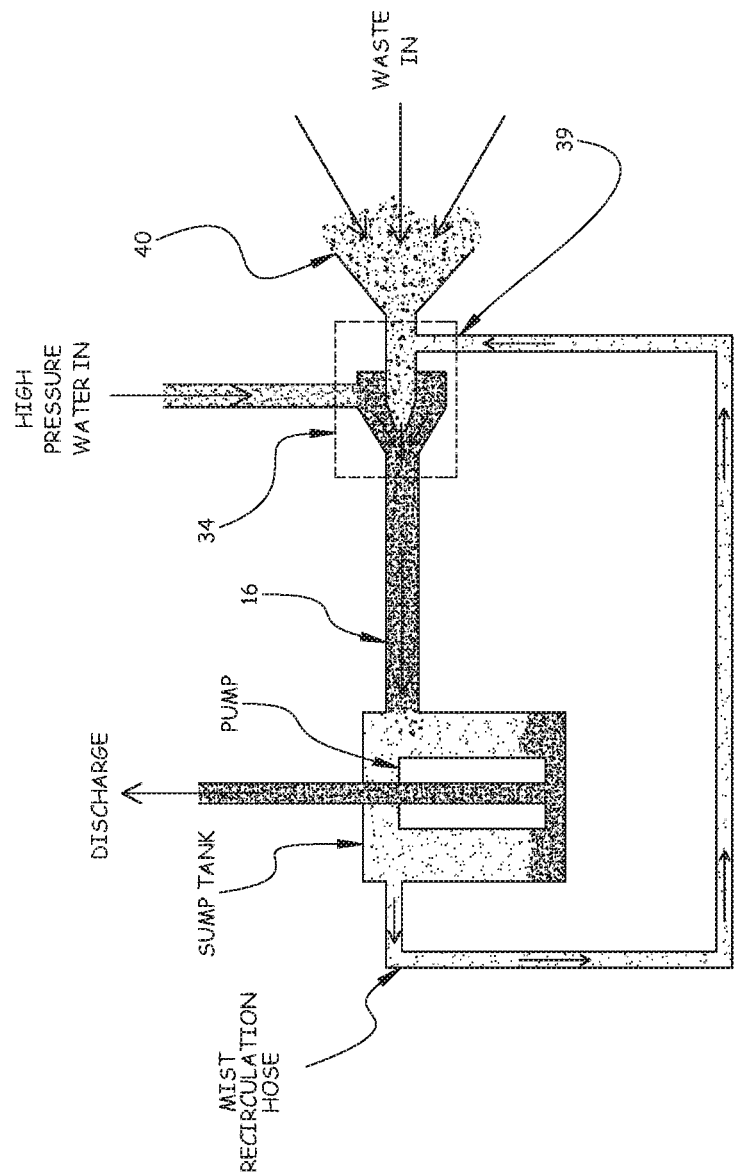

MECHANICAL DRY WASTE EXCAVATING END EFFECTOR

RELATED APPLICATIONS

This application claims the benefit of priority to U.S. Provisional Patent Application Ser. No. 62/826,365 filed Mar. 29, 2019, which is incorporated by reference in its entirety.

FIELD OF INVENTION

This invention relates to tank cleaning, and in particular to mechanical devices, apparatus, systems, and methods for the fragmentation, manipulation, modification, and/or retrieval of chemical, radioactive, hazardous, or other waste material in storage tanks without introducing large amounts of free water or a liquefier into the tank. The invention can work with tanks having high temperature or low temperature conditions. This invention can also work in areas with high doses of radiation.

BACKGROUND AND PRIOR ART

Across the United States radioactive material is stored in hundreds of underground storage tanks. Sluicing technologies have been used to break up and retrieve the material located in these tanks. These systems utilize a fluid jet from a nozzle to impact, break up, and liquefy in-tank material so it can be pumped out of the tank.

In many cases, however, this use of water or fluids as liquefier poses significant challenges. For instance, if a tank is known or suspected of having structural flaws, large volumes of free fluid in the tank becomes a potential for leakage into the environment that may carry contaminated material with it and thus contaminating neighboring properties as well as subterranean and underground water. Additionally, the use of large quantities of fresh water or liquefier costs money and resources and also produces large quantities of contaminated liquefier that will then have to be treated and disposed of.

Additionally, typical radioactive tanks are configured with limited numbers of access points that can accommodate the type equipment proposed herein. A way to change out end effectors would substantially increase productivity and provide a way to use multiple end effectors without taking up multiple access points to the tank(s).

An additional problem with typical cleaning systems Is end effector wear and failure. Since the end effectors are closest to the radioactive waste, and see the most operation, they can succumb to premature failure while the rest of the arm is still fully functional. It is far too expensive with far too much liability to remove the entire machine from the tank for repairs. Therefore, the entire machine is rendered inoperable with these types of failures.

Furthermore, typical equipment only allows for a single technology such as sluicing, sampling, removing hazards, etc. Waste in tanks can vary in type and consistency where different methodologies are essential for optimal performance. Multiple machines can be used in a single tank, but this increases operational costs. And if multiple machines are used, there are a limited number of usable openings in the tanks; thus, limiting the number of possible machines. This singular functionality also does not allow the opportunity to perform other functions in the tank such as collecting samples, removing hazards, or some other work other than cleaning that require specialized end effectors.

Lastly, due to physical constraints of the prior art, there is a limit to how much of the liquefied waste can be captured and removed from the tank. While most of the waste Is removed, it is not eliminated and leaving radioactive waste behind that can then leak.

Thus, the need exists for solutions to the above problems with the prior art.

SUMMARY OF THE INVENTION

A primary objective of the present invention is to provide devices, apparatus, systems, and methods for cleaning contaminated tanks by breaking down and classifying the waste in to small particles without introducing any or large amounts of free water or a liquefier into the tanks.

A secondary objective of the present invention is to provide a system, device and methods that enhance any tool, such as a manipulator arm or wheeled or tracked vehicle, with the capability of employing varying and effectors with a single tool. This improves efficiency by eliminating the time required to replace entire machine. This also incorporates a quick disconnect feature to allow the end effector to be replaced if it becomes inoperable.

The Mechanical Dry Waste Excavating End Effector is primarily an end effector that breaks up and collects waste with little or no water, liquid, or fluids free in the tank. A mechanical gathering arm sits atop a bucket assembly. The end of the gathering arm can be integrated with a variety of tools. These tools can include, but not limited to, a scraper, rotating grinding drum, and/or a set of reciprocating tines. An articulating gathering arm can drag the waste into the trough of the bucket where a screw conveyor feeds an eductor that discharges the waste to any pump, tank or other process equipment. A screen can be incorporated to allow the passage of smaller material prior to entering a macerator in the trough. Furthermore, rotating drums with blades or teeth can further crush and classify larger debris into pieces that are safe for downstream process equipment.

The invention can be mounted on the end of any manipulator including, but not limited to, any boom, vehicle, robotic arm, or other remote or man operated device used in tank cleaning. On one end of the invention is an apparatus with quick disconnect functionality and provides circuits such as hydraulics, pneumatics, high pressure/low flow water, low pressure/high flow water, supernate, and a suction line for waste conveyance. Locating pins ensure proper alignment between the end effector and mounting on the end of the manipulator with compliance is built in to allow for minor misalignment during initial engagement.

A failsafe mechanism prevents accidental separation of the end effector from the mounting plate. If the end effector becomes inoperable, or a new method is required, it is attached in such a way that it can be easily removed, via remote mechanism if necessary. The manipulator can move into a position where it release and swap out the end effector. The end effector can also be stored in a storage container that shields against radiation exposure outside the tank in a further embodiment, the end effector is constructed of materials that allow it to be rinsed of the radioactive waste prior to containment.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 4A shows a perimeter jet eductor.

DESCRIPTION OF THE PREFERRED EMBODIMENTS

Figure 1:
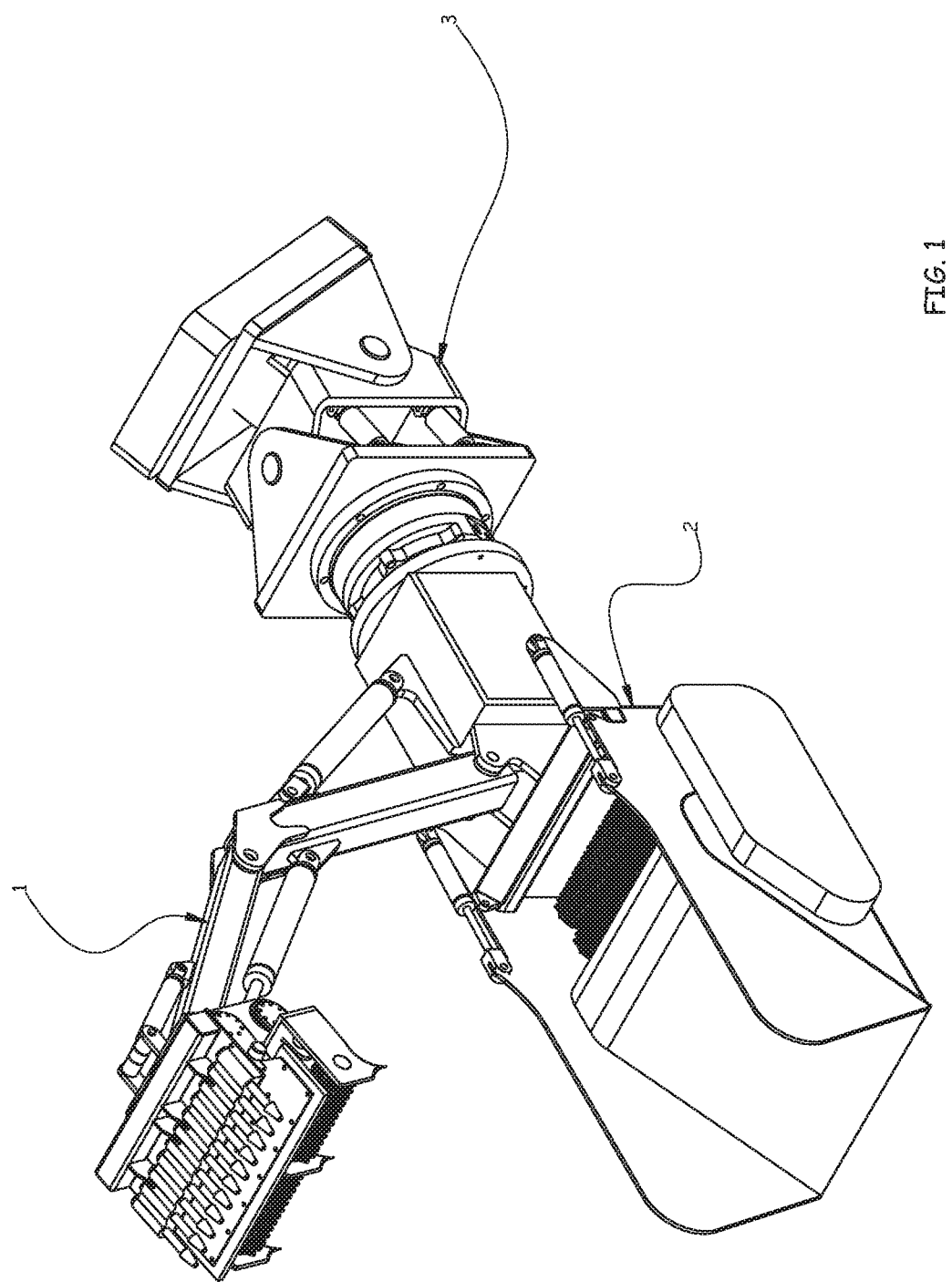
FIG. 1 illustrates an isometric view of the Mechanical Dry Waste Excavating End Effector.

Before explaining the disclosed embodiments of the present invention in detail it is to be understood that the invention is not limited in its applications to the details of the particular arrangements shown since the invention Is capable of other embodiments. Also, the terminology used herein Is tor the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

Figure 1A:
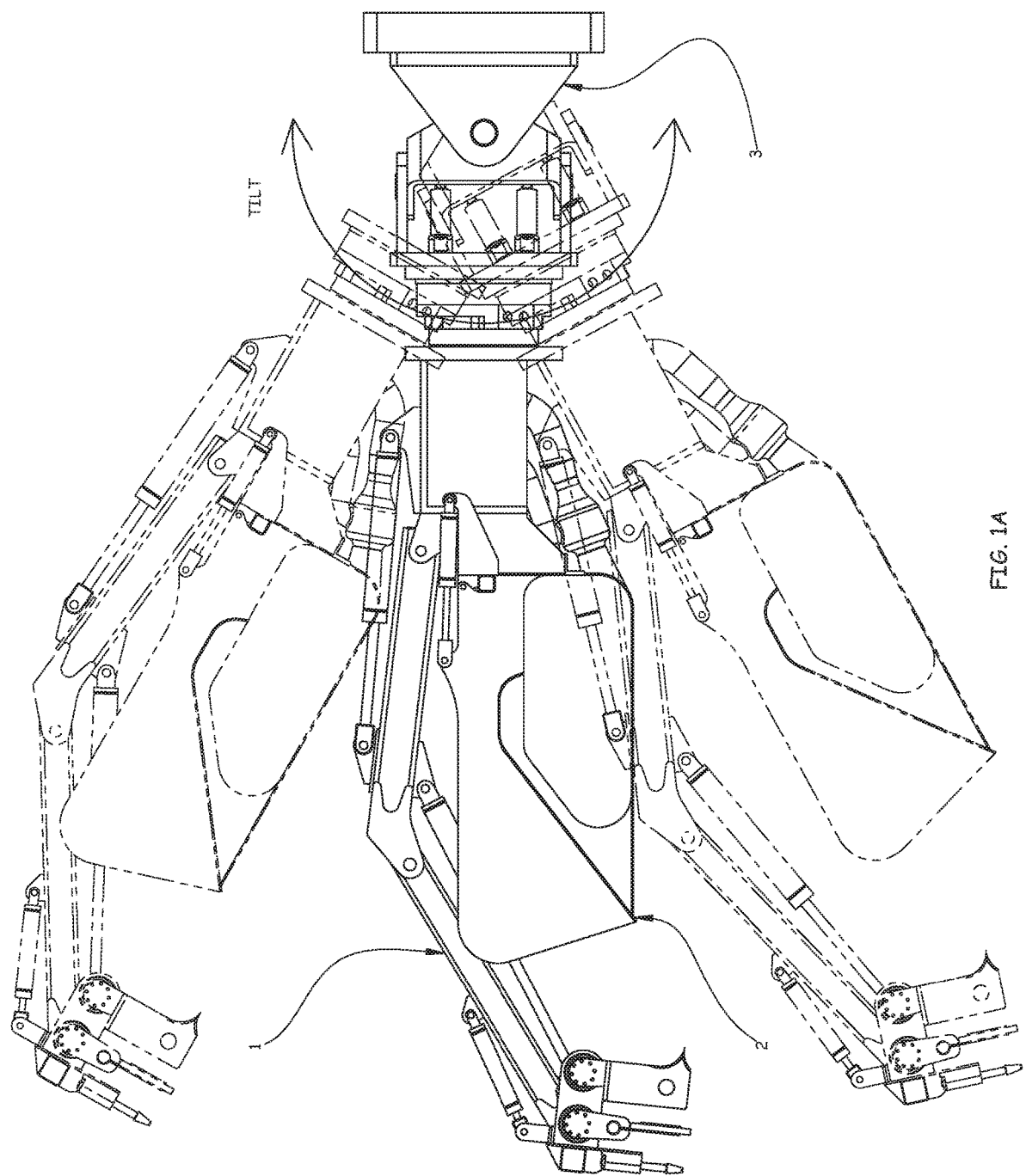
FIG. 1A illustrates a side view of the Mechanical Dry Waste Excavating End Effector illustrating the tilt axis.
Figure 1B:
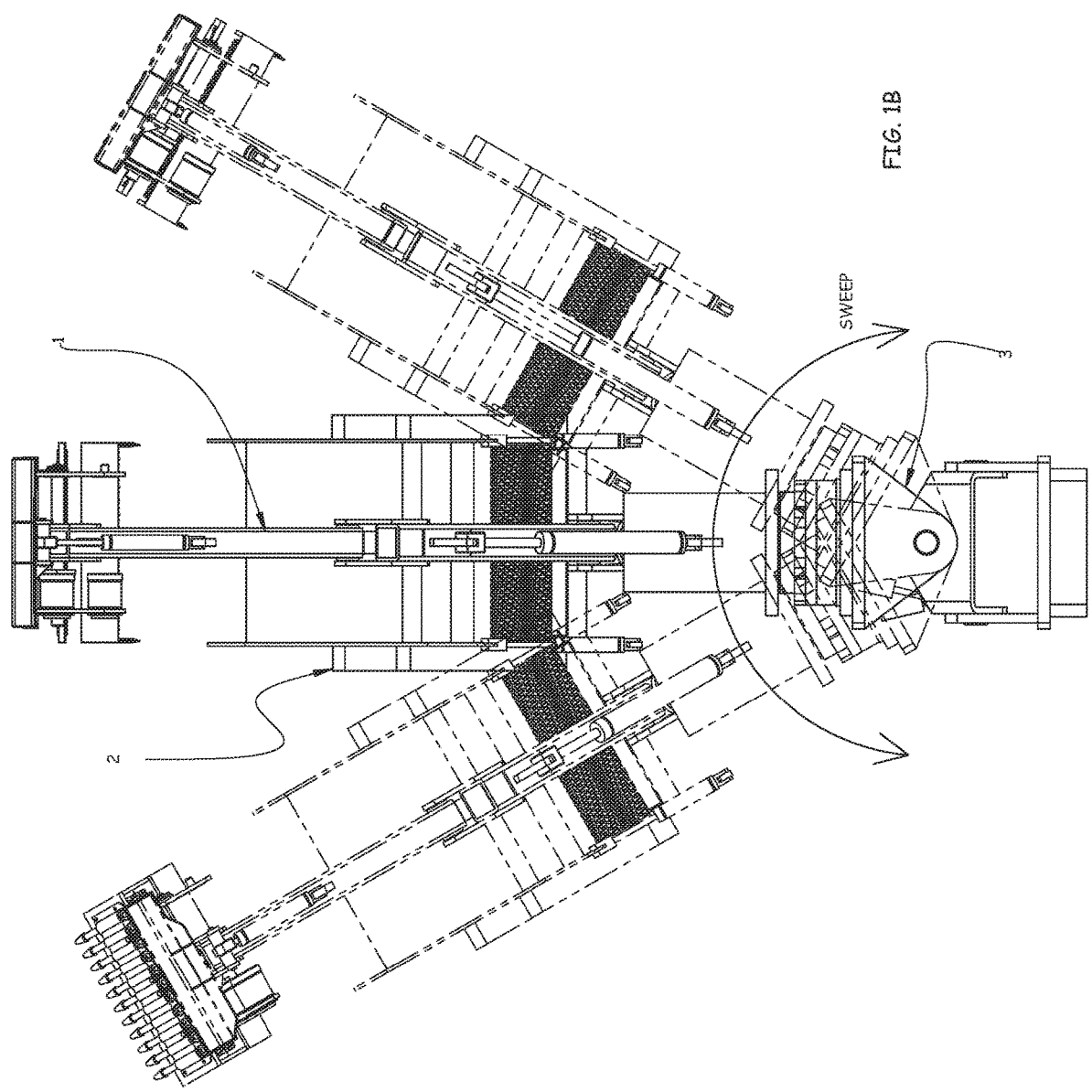
FIG. 1B illustrates a side view of the Mechanical Dry Waste Excavating End Effector illustrating the pan, or sweep, axis.

FIG. 1 illustrates an isometric view of the Mechanical Dry Waste Excavating End Effector. FIG. 1A illustrates a side view of the Mechanical Dry Waste Excavating End Effector illustrating the tilt axis. FIG. 1B illustrates a side view of the Mechanical Dry Waste Excavating End Effector illustrating the pan, or sweep, axis.

In reference to FIGS. 1, 1A and 1B, the Mechanical Dry Waste Excavating End Effector is comprised of a bucket assembly 2 and gathering arm assembly 1 mounted to the end of an articulating wrist assembly 3.

Range of Motion

Figure 2:
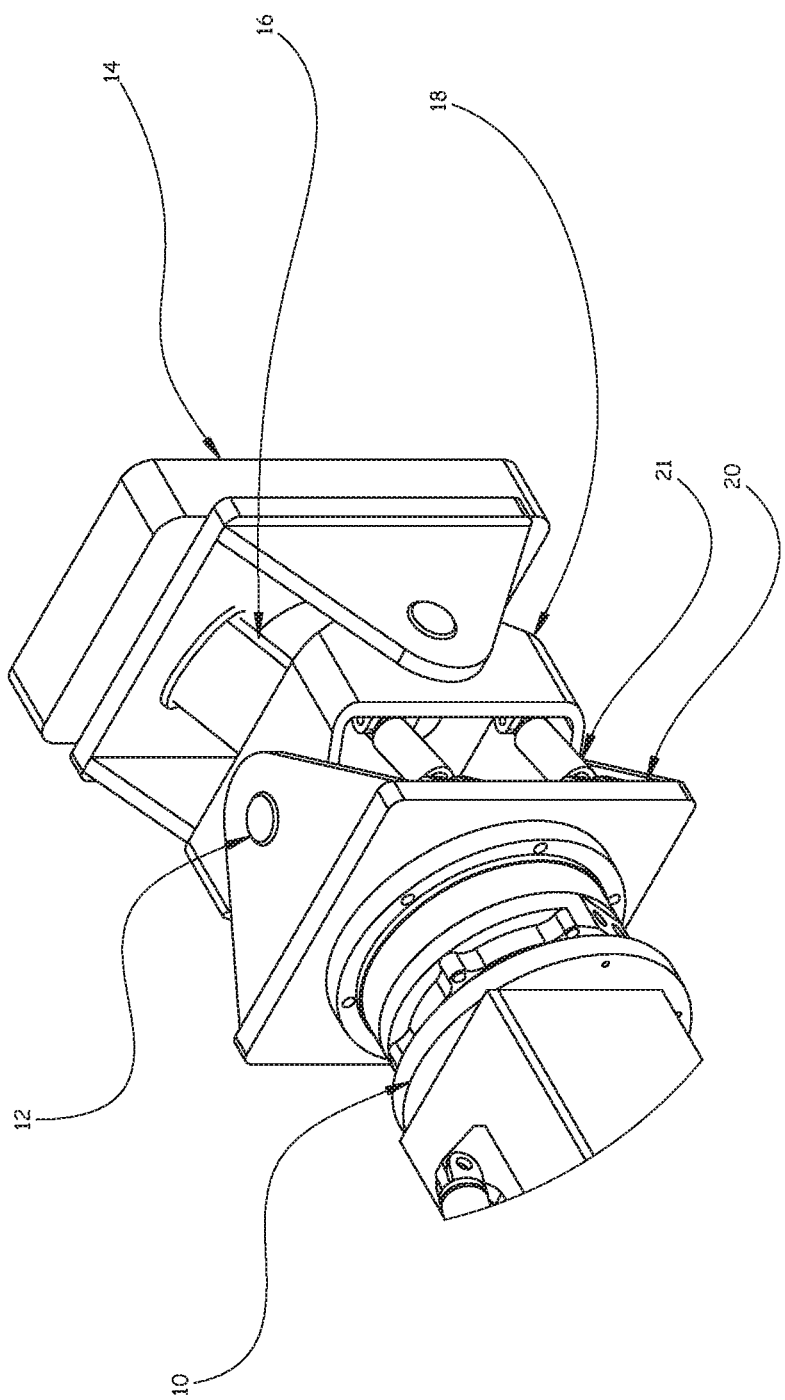
FIG. 2 is a close up cropped view of the wrist assembly.

FIG. 2 Is a close up cropped view of the wrist assembly 3 comprised of a quick disconnect receiver plate 14 and a set of forked linkages 20 couple through a center linkage 18 with corresponding pivot points 12 opposed at 90 degrees. The pivot points can be comprised of pins in conjunction with bearings or bushings. In a further embodiment, the pins can have metal to metal contact using the same or differing materials to reduce friction. Oil or grease can be also be used to reduce friction and prevent galling. This articulating wrist assembly 3 joint provides two degrees of freedom, pan and tilt. The pan axis is comprised of hydraulic cylinders 21 to sweep the assembly through the plane horizontal about the end effectors longitudinal axis. The pan axis allows the end effector to sweep back and forth as the end effector is manipulated. The tilt axis is comprised of hydraulic cylinders to rotate the assembly through a plane vertical about the bucket assembly's 2 longitudinal axis. The tilt axis allows the end effector to be rotated in order to maintain position relative to the tank floor or waste. In alternate embodiments, a hydraulic motor can be used to actuate the pan and tilt functions. In an even further embodiment, a hydraulic rotary actuator can be used to actuate the pan and tilt functions.

In an enhanced embodiment, the Mechanical Dry Waste Excavating End Effector wrist assembly 3 is coupled to a hydraulic rotary cylinder 10 comprised of a tube rotating internal to a fixed outer tube supported through bearings a roll axis. Affixed to the rotating tube is a vane, that when hydraulic pressure is applied, causes a tangential force and in turn rotation of the bucket assembly 2 about the longitudinal axis. Affixed to the outer tube is a stopper that limits the rotation. The rotating tube incorporates a hollow bore to permit the passage of a hose bundle 16 that is comprised of, but not limited to, hydraulic fluid, compressed air, high pressure/low flow fluid, low pressure/high flow fluid, supernate, and discharge hoses. A combination of some or all of these can be accommodated. In a further embodiment, these hoses can be constructed such that each of the smaller diameter hoses reside inside that large diameter discharge hose to allow for a compact design. The output of the rotary cylinder 10 is coupled to the support weldment of the Bucket Assembly 2.

Figure 2A:
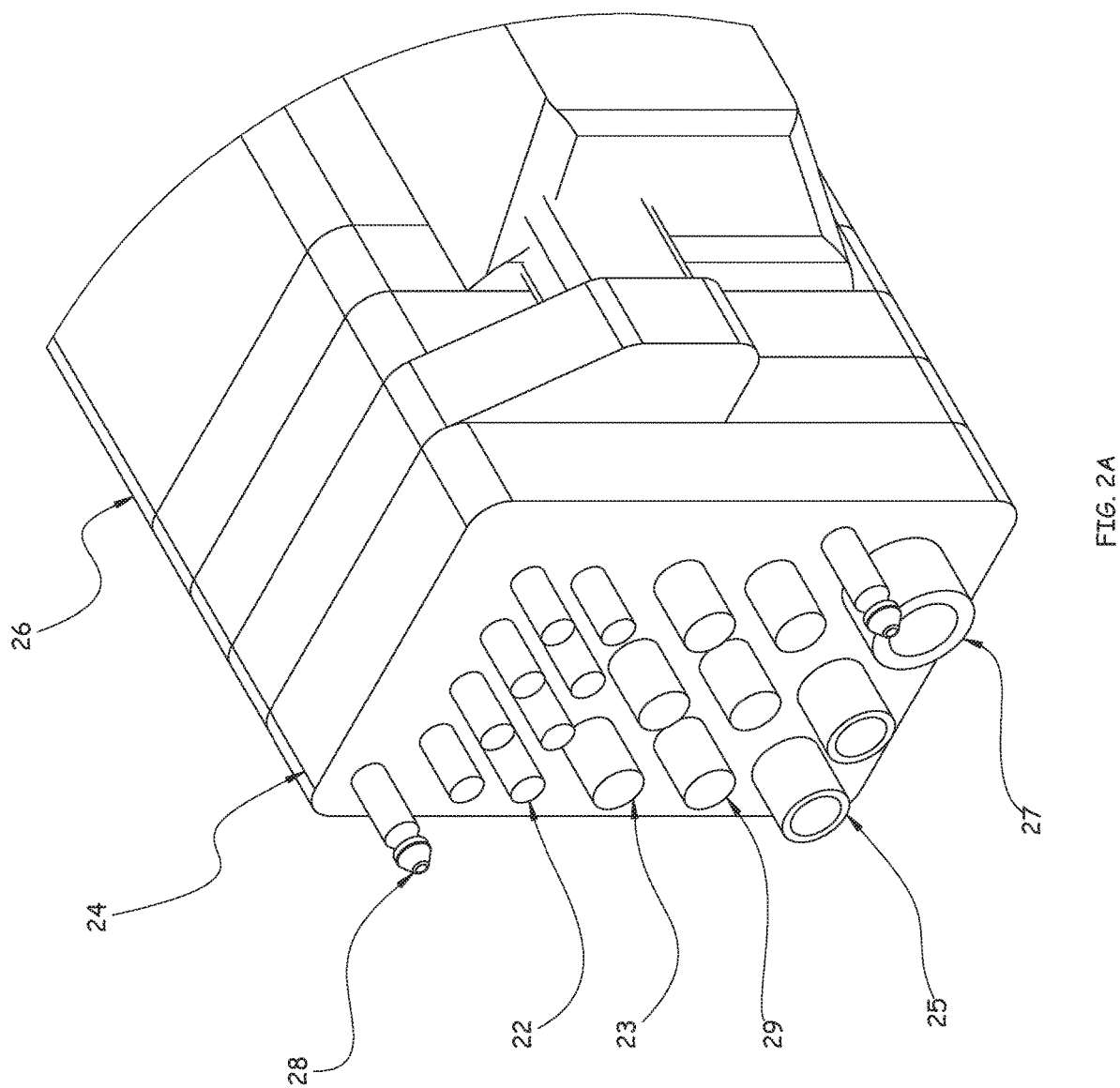
FIG. 2A is an enlarged view of the quick disconnect plate on the distal end of a generic manipulator arm.

FIG. 2A is an enlarged view of the quick disconnect plate 24 on the distal end of a boom 26. The boom 26 can be any manipulator including, but not limited to, any boom, vehicle, robotic arm, or other remote or man operated device used in tank cleaning where the quick disconnect plate 24 can be configured with any combination of hydraulic 29, pneumatic 23, electrical 22, suction 27, supply connections 25, or locating pins 28 to match. If further embodiments, the Mechanical Dry Waste Excavating End Effector can be directly affixed to the boom 26 by fasteners, welding, or any other mechanical means to secure structural elements.

Bucket Assembly

Figure 3:
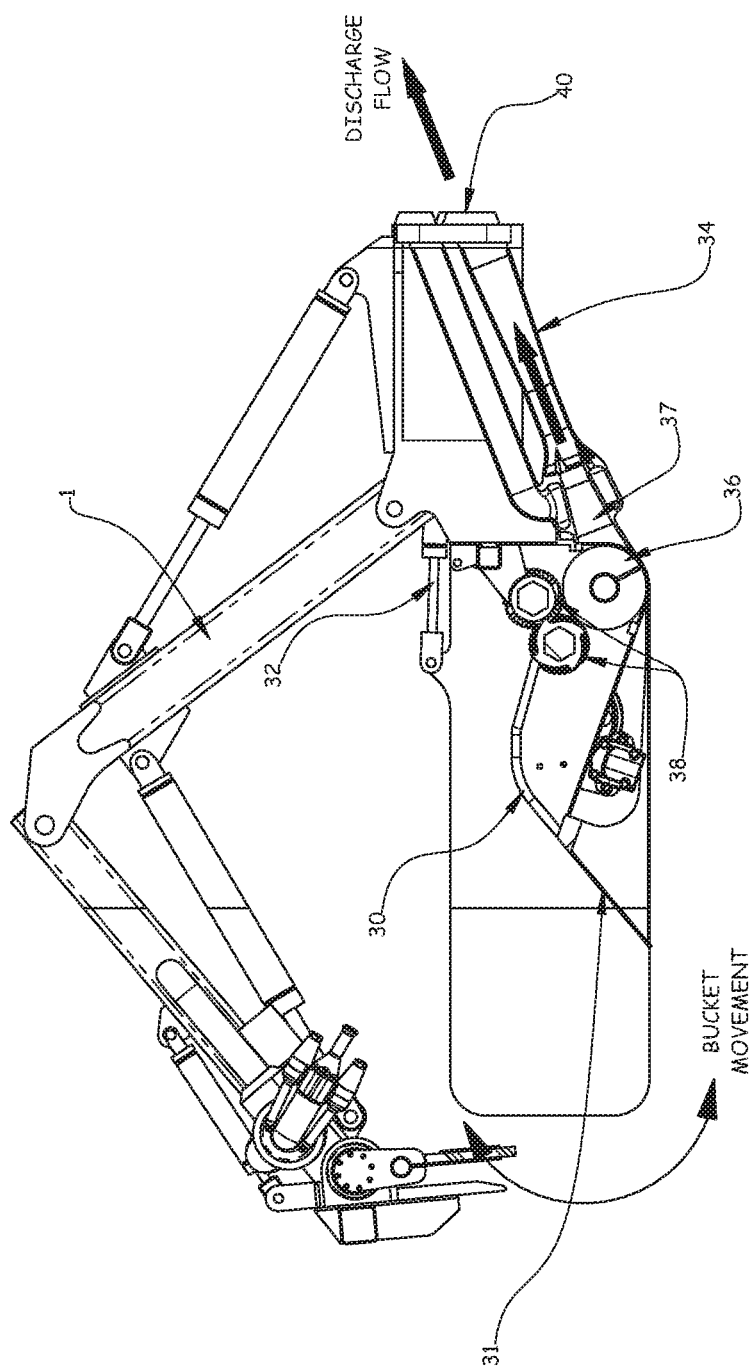
FIG. 3 shows a section view of the bucket assembly and gathering arm.
Figure 4:
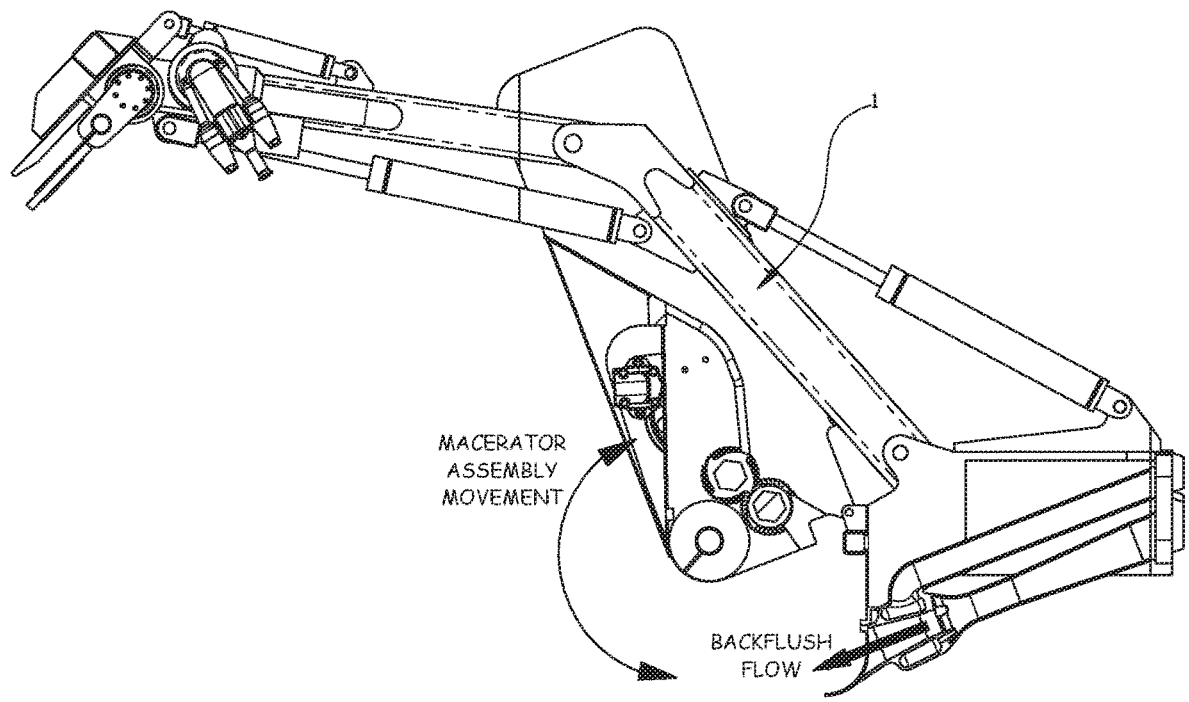
FIG. 4 shows a section view of the bucket assembly and gathering arm with the bucket in the open position.
Figure 5:
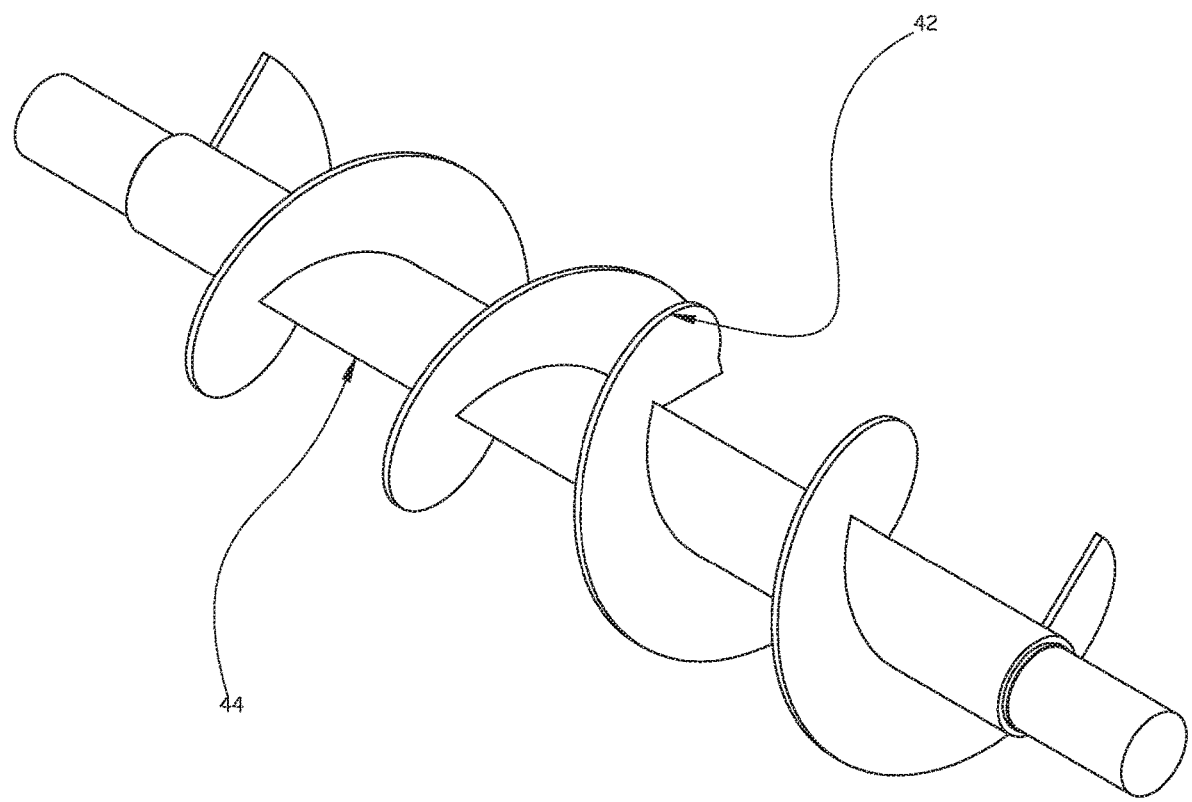
FIG. 5 is an isometric view of the screw conveyor.
Figure 6:
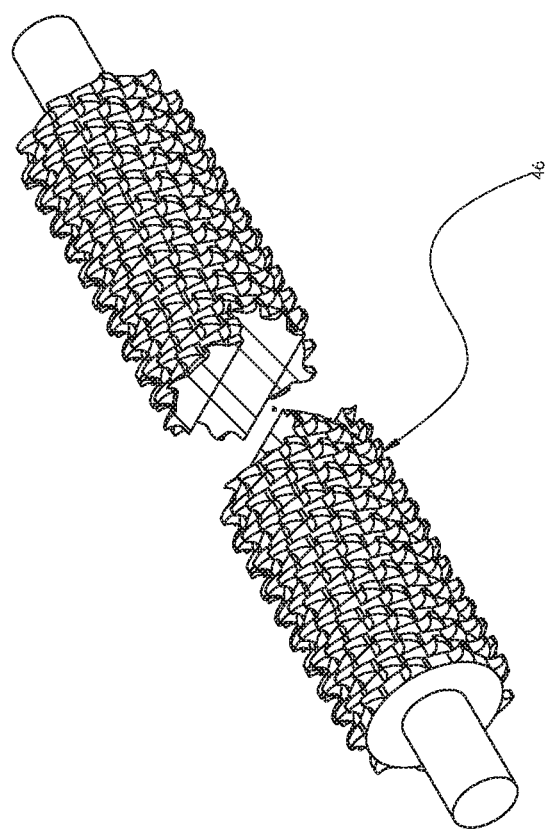
FIG. 6 is an isometric view of the macerator drum.

FIG. 3 shows a section view of the bucket assembly 2 with gathering arm 1. FIG. 4 shows a section view of the bucket assembly 2 with gathering arm 1 with the bucket in the open position. FIG. 5 is an isometric view of the screw conveyor 36. FIG. 6 is an isometric view of the macerator drum 38.

In reference to FIGS. 3-6, the Bucket Assembly 2 is comprised of a ramp 31, parallel bar wedge-wire screen 30, macerator 38, screw conveyor 36, and eductor 34. The Bucket Assembly 2 provides a receptacle for the waste gathered by the Gathering Arm 1. Waste is pulled up the ramp 31 of the bucket and collected in a trough area. The trough feeds a centering screw conveyor 36, which pushes the waste into an eductor 34 which discharges said waste into the discharge line which feeds any pump, tank or other process equipment. The screw conveyor 36 is driven through a hydraulic motor and chain drive or gear train. The screw conveyor 36 is comprised of a main shaft 44 with two opposing helical blades 42 such that when the screw rotates, the helical blades 42 persuade the waste from each side to the point of intersection above the eductor 34.

A macerator 38 assembly can be included above the centering screw 36 in order to classify and further break down the material being retrieved. These features also help to prevent fouling and protect the eductor 34 from large debris. The macerator is comprised of two opposing drums with teeth 46, spaced in an offset pattern about the circumference. The teeth 46 can be fabricated from any carbon, alloy, tool, or stainless steel in the annealed, tempered or hardened state, In a further embodiment, the teeth can be carbide or carbide tipped. The drums are axially spaced such that the teeth come in close proximity in order to classify into pieces safe for pumps and other process equipment. The drums are driven through a hydraulic motor. The drums rotate in opposing directions and draws the waste through towards the screw conveyor 36. The drums can also be reversed to eject any nuts, bolts, or material that can foul the drums.

The ramp 31 and macerator 38 and screw assembly 36 can be pivoted away from the eductor 34 in order to allow the bucket to be cleared of debris and the eductor to be back flushed. Hydraulic cylinders rotate the ramp 31 and macerator 38 and screw assembly 38 up to approximately 90 degrees.

A parallel bar wedge-wire screen 30 in front of the macerator 38 allows smaller material up to, safe in size for the eductor 34 or any other process equipment, to bypass the macerator 34. This prolongs the life of these components and increases the available system throughput.

FIG. 4A depicts a perimeter jet eductor 34 uses pressurized fluid to provide vacuum on the eductor inlet 37 to draw the material in from the centering screw conveyor 36, while providing positive pressure on the eductor outlet 40 to push this material through the hose 16 into any pump, tank or process equipment. The perimeter jet configuration provides an unobstructed throat, helping to prevent fouling and allow for back flushing. Integrated into the eductor inlet is a port 39 with a connection from a pump to allow mist generated to be recirculated so as not to be vented back into to the tank and improving visibility.

Gathering Arm Assembly

Figure 7:
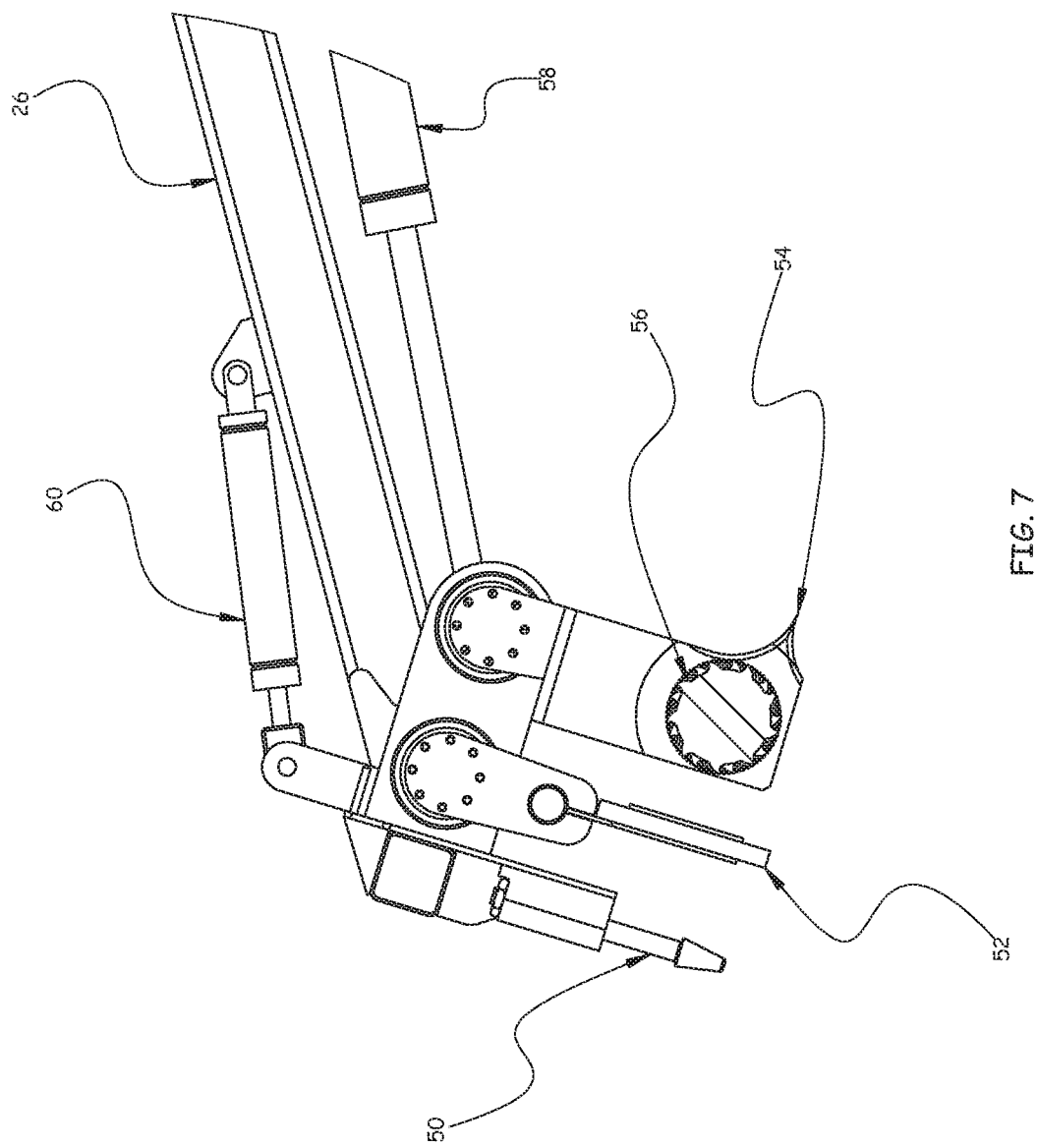
FIG. 7 is side view of the tines, scraper, and grinding drum on the second end of the gathering arm boom.
Figure 8:
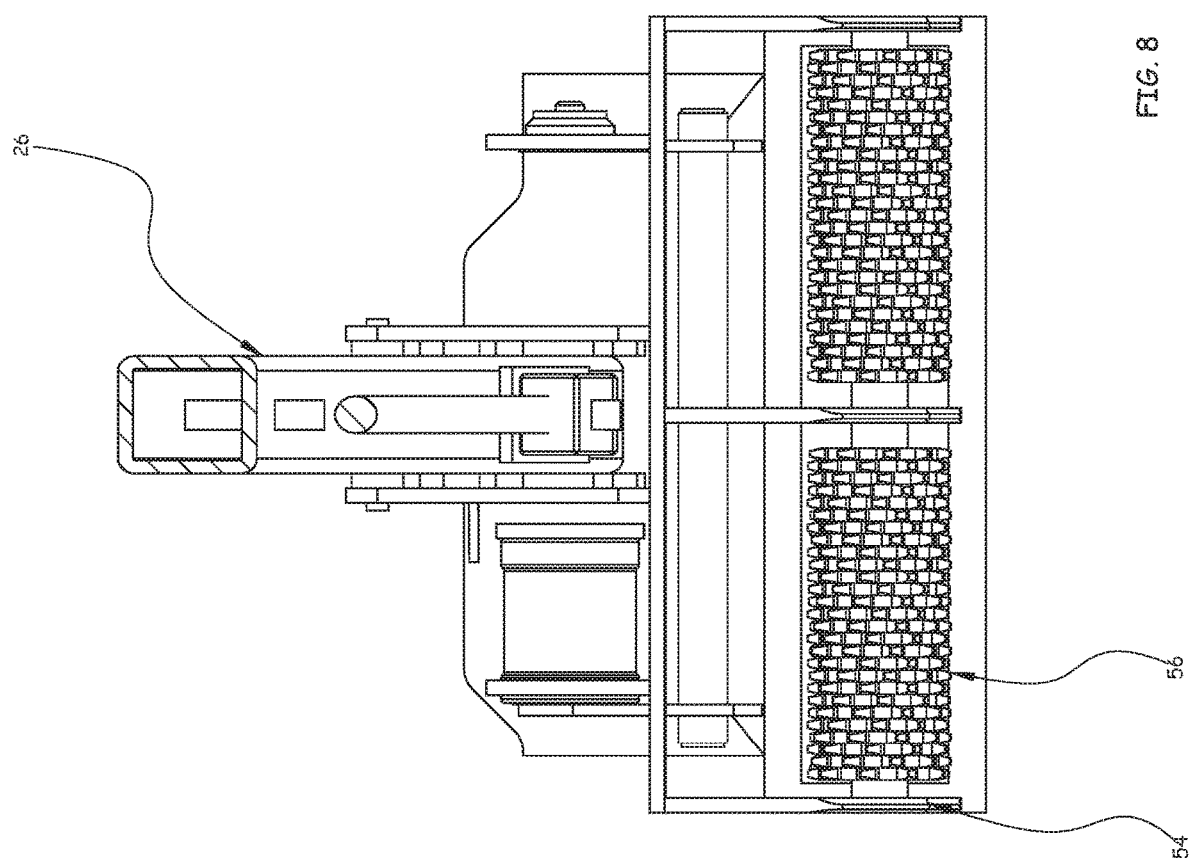
FIG. 8 shows a front view of the grinding drum assembly.

FIG. 7 Is side view of the tines 50, scraper 52, and grinding drum 54 on the second end of the gathering arm boom 26. FIG. 8 shows a front view of the grinding drum assembly.

In reference to FIG. 3, FIG. 4, FIG. 7 FIG. 8, and FIG. 10 the Gathering Arm Assembly 1 can be used to break up and pull waste into the bucket. The gathering arm 1 consists of a mast 70 and boom 26 arrangement. Hydraulic cylinders 72 actuate the mast 70 relative to the bucket assembly 2 through the plane vertical about the end effectors longitudinal axis. Hydraulic cylinders 58 actuate the boom 26 relative to the mast 70 through the same plane vertical about the end effectors longitudinal axis. In an alternate embodiment, rotary hydraulic actuators or motors can be incorporated to actuate either the boom 26 or the mast 70 or both.

On the distal end of the boom 26 is a joint that allows actuation of tooling that can include but not limited to a scraper 52, tines 50 and/or grinding drum 56. The tooling can be actuated approximately up to 60 degrees about its longitudinal axis through hydraulic cylinder or cylinders. In an alternate embodiment, rotary hydraulic actuators or motors can be incorporated. In even further embodiments, a linkage can be incorporated to increase the range of motion up to approximately 180 degrees.

The scraper on the distal end of the boom 26 can be used to break waste and draw it into the bucket assembly 2. The scraper can be comprised of a plate, formed plate or a plate with teeth. The plate can be fabricated from any carbon, alloy, tool or stainless steel in the annealed, tempered or hardened state. In certain embodiments, a squeegee can be added to pull already existing liquid or light slurries into the bucket. The squeegee 78 can be of any rubber or plastic that can withstand high temperatures and/or high doses of radiation. The scraper 52 can be fixed, or in another embodiment, coupled to a rotary actuator for independent movement.

A plurality of tines 50 can be used to further breakdown waste. These tines can be round, square or rectangular in cross section and constructed from any carbon, alloy, tool, or stainless steel in the annealed, tempered or hardened state. In certain embodiments, the tines are spring loaded and incorporate a vibrating or reciprocating motion through hydraulic or pneumatic actuation to provide a jackhammer functionality. The travel of the tines is limited so as not to engage and damage the tank floor.

In a further embodiment, a hydraulically driven grinding drum 56 with teeth 46, spaced in an offset pattern about the circumference, can provide a surface grinding action. The teeth 46 can be fabricated from any carbon, alloy, tool, or stainless steel in the annealed, tempered or hardened state. In a further embodiment, the teeth 46 can be carbide or carbide tipped. The grinding drum 56 is supported by bearings mounted in two outboard support plates 64 and an intermediate plate 66. These plates extend past the perimeter of the teeth of the grinding drum 56 to prevent damage though contact between the drum and the floor of a tank. On the leading edge of the plates, a sharpened edge 54 provides means to cut through waste as the gathering arm 1 is dragged through the waste. The grinding drum 56 can be rotated about its longitudinal axis through a hydraulic motor coupled to a gearbox and chain drive. In an alternate embodiment, the drum 56 can be driven through a hydraulic motor and gearset. The grinding drum assembly can be fixed or, in another embodiment, coupled to a rotary actuator for independent movement.

Figure 9:
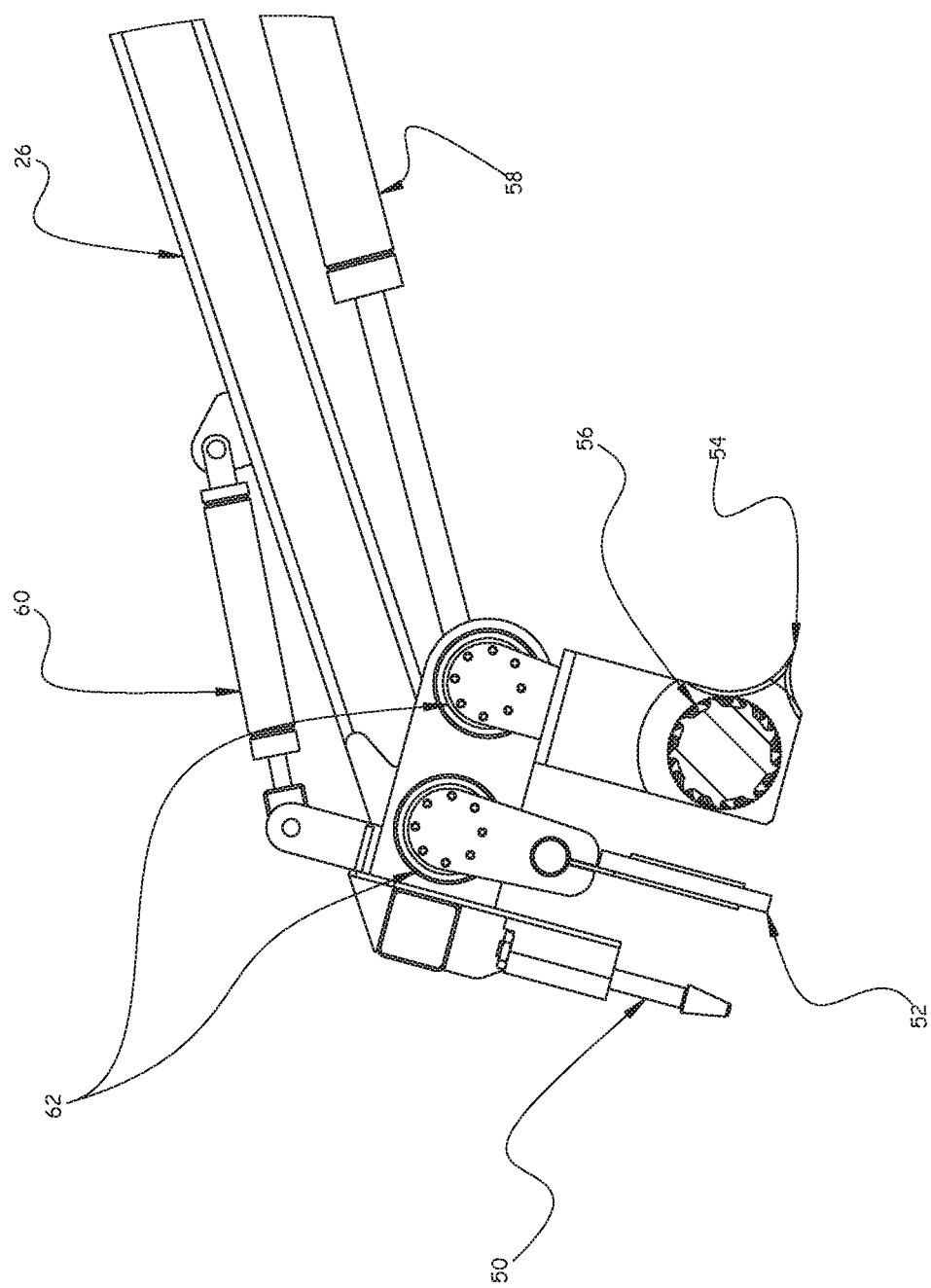
FIG. 9 is a side view of the gather arm with independent actuation of the scraper and grinding drum.

FIG. 9 is a side view of the gather arm with independent actuation of the scraper 52 and grinding drum assembly through rotary actuators 62. In further embodiments, the independent motion can be done using independent hydraulic cylinders. The tines can be fixed or reciprocating.

Figure 10:
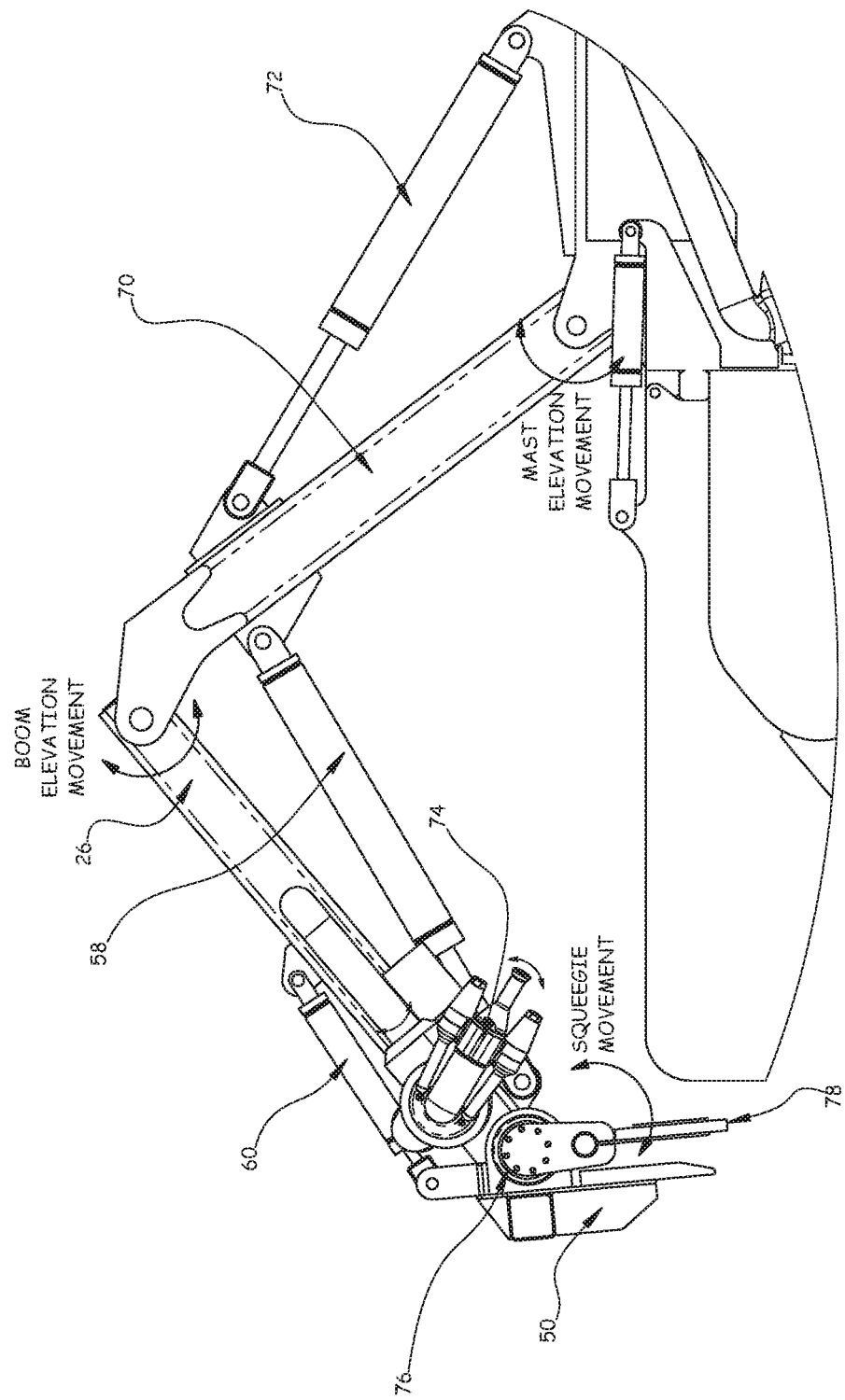
FIG. 10 is an enlarged view of the quick disconnect plate on the distal end of a generic manipulator arm.

In reference to FIG. 10, an even further embodiment depicts a gathering arm 1 with a high pressure/low flow water, low pressure/high flow nozzle 74 affixed to the second end of the boom 26. The nozzle 74 includes rotary seals and bearings to allow for 360 degrees of rotation actuated by a hydraulic motor. The nozzle can further break waste as well as clear debris inside the bucket assembly 2 while not getting water or liquefier into the tank.

Figure 11:
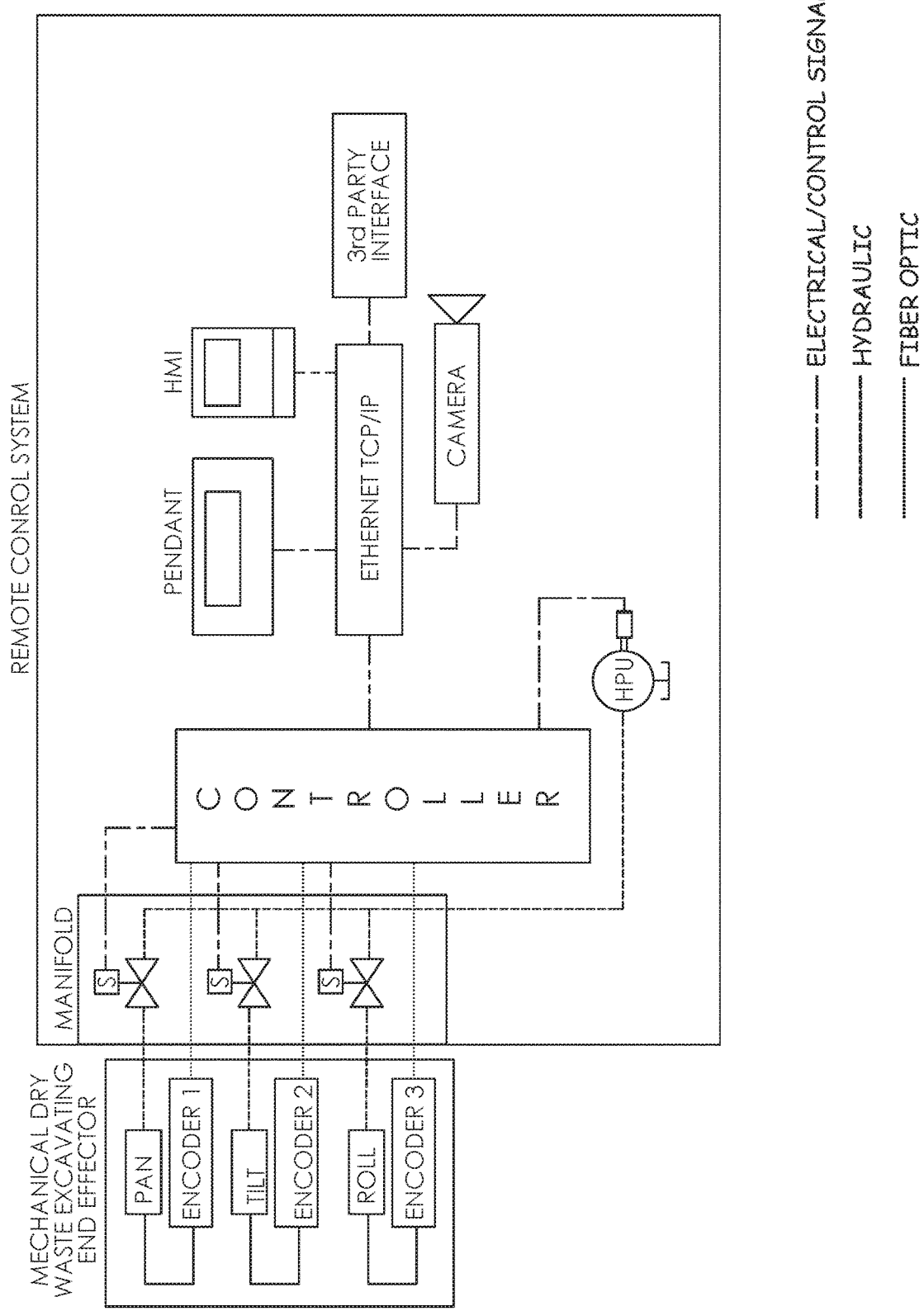
FIG. 11 is a block diagram of a control system for remote operation of the mechanical dry waste excavating end effector.

In reference to FIG. 11, the Mechanical Dry Waste Excavating End Effector can be automated or semiautomated through a remote-control system comprised of remote valves mounted to a manifold, encoders, hydraulic power unit, and one or more human machine interfaces (HMI). In some embodiments, a third-party interface, a camera system, or remote pendant can be integrated. Using a control signal thru optic cable which does not present an ignition source for flammable gases or materials; therefore, The preferred embodiment uses feedback from fiber optic optical encoders at each or some of the axis allowing the invention to be implemented in hazardous, explosive environments. In further embodiments, the fiber optic cable signal and hydraulic power can connect through the quick disconnect mounting plate.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A mechanical dry waste excavating end effector system for cleaning contaminated tanks without the use of liquids, comprising:
a bucket assembly that includes a ramp having a lower front end and a rear end that rises up to a trough for collecting waste; and
an articulating gathering arm assembly on top of the bucket assembly, the articulating gathering arm assembly to break up and pull the waste into the ramp of the bucket assembly, the articulating gathering arm assembly moves relative to the bucket assembly.

2. The mechanical dry waste excavating end effector system of claim 1, wherein the bucket assembly comprises:
a trough having a hydraulically driven screw conveyor comprised of a main shaft with two opposing helical blades such that when the screw rotates, the helical blades persuade the waste from each side to the point of intersection above an eductor; and
a macerator comprised of two opposing drums to further break down waste and which can be reversed to eject nuts, bolts, or any material that can foul the drums; and
a parallel bar wedge-wire screen at the end of the ramp to classify particles down to approximately ⅜" prior to the macerator.

3. The mechanical dry waste excavating end effector system of claim 2, wherein the macerator includes:
two opposing drums with teeth fabricated of any carbon, alloy, tool, or stainless steel in the annealed, tempered or hardened state and spaced in an offset pattern about the circumference.

4. The mechanical dry waste excavating end effector system of claim 2, wherein the macerator includes:
two opposing drums with teeth fabricated of carbide or carbide tipped and spaced in an offset pattern about the circumference.

5. The mechanical dry waste excavating end effector system of claim 2, wherein the bucket assembly further comprises:
the trough with a crusher over the screw conveyor which feeds collected waste into the educator.

6. The mechanical dry waste excavating end effector system of claim 2, wherein the bucket assembly includes:
a pivoting bucket assembly to allow for the clearing of debris and back flushing of the eductor.

7. The mechanical dry waste excavating end effector system of claim 2, wherein the bucket assembly further comprises: an eductor inlet with a port in order to couple to a pump allowing mist generated to be recirculated and not vented back into to the tank and improving visibility.

8. The mechanical dry waste excavating end effector system of claim 1, further comprising fiber optic encoders on at least one axis for providing remote control feedback in hazardous explosive environments.

9. The mechanical dry waste excavating end effector system of claim 1, wherein the gathering arm assembly further comprises:
a mast elevation cylinder having a lower end pivotally attached to the bucket assembly and an upper end pivotally attached to an upper portion of the pivoting mast for controlling the mast relative to the bucket assembly;
a boom elevation cylinder for having a first end pivotally attached to another upper portion of the pivotal mast and a second end pivotally attached to another portion of the base of an end effector.

10. The mechanical dry waste excavating end effector system of claim 9, wherein the end effector further comprises:
a grinding drum coupled to a hydraulic motor; the grinding drum comprised of a toothed cylinder supported by plates with sharp leading edges to cut through waste as the tool is dragged across the waste.

11. The mechanical dry waste excavating end effector system of claim 9, wherein the end effector further comprises:
a grinding drum coupled to a hydraulic motor; and
a plurality of spring loaded hardened tines and
a pivoting scraper.

12. The mechanical dry waste excavating end effector system of 11, wherein the scraper includes a squeegee.

13. The mechanical dry waste excavating end effector system of claim 11, wherein the plurality of spring loaded hardened tines are reciprocated linearly up and down through pneumatic actuation.

14. The mechanical dry waste excavating end effector system of claim 11, wherein the plurality of spring loaded hardened tines are reciprocated linearly up and down through hydraulic actuation.

15. The mechanical dry waste excavating end effector system of claim 1, further comprising:
   a second end having a quick disconnect mounting plate.

16. The mechanical dry waste excavating end effector system of claim 15, further comprising a wrist assembly providing pan, tilt and roll through hydraulic actuation, wherein the gathering arm assembly is mounted to an end of the wrist assembly.

17. A mechanical dry waste excavating end effector system for cleaning contaminated tanks without the use of liquids, comprising:
   a bucket assembly that includes a ramp having a lower front end and a rear end that rises up to a trough for collecting waste; and
   an articulating gathering arm assembly moveably supported on top of the bucket assembly, the articulating gathering arm assembly to break up and pull the waste into the ramp of the bucket assembly;
   an end effector on and end of the gathering arm, the end effector being selected from at least one of a scraper, rotating grinding drum and set of reciprocating tines;
   a wrist assembly attached to the bucket assembly and the gathering arm assembly, the wrist assembly providing pan, tilt and roll through hydraulic actuation, wherein the gathering arm assembly is mounted to an end of the wrist assembly; and
   a quick disconnect mount for mounting the mechanical dry waste excavating end effector system to an end of a manipulator selected from at least one of a boom, a vehicle, a robotic arm, a remote controlled device, a manual operated device, wherein the manipulator is used in tank cleaning operations, and wherein the articulating gathering arm assembly moves relative to the bucket assembly.

18. The mechanical dry waste excavating end effector system of claim 17, wherein the bucket assembly comprises:
   trough having a hydraulically driven screw conveyor comprised of a main shaft with two opposing helical blades such that when the screw rotates, the helical blades persuade the waste from each side to the point of intersection above an eductor; and
   a macerator comprised of two opposing drums to further break down waste and which can be reversed to eject nuts, bolts, or any material that can foul the drums; and
   a parallel bar wedge-wire screen at the end of the ramp to classify particles down to approximately ⅜" prior to the macerator.

* * * * *